United States Patent [19]

Andersen et al.

[11] Patent Number: 4,764,662
[45] Date of Patent: Aug. 16, 1988

[54] AUTOMATIC HEATING DEVICE

[75] Inventors: George L. Andersen, Newtown Sq.; Claude A. Pezzopane, Honeybrook, both of Pa.

[73] Assignee: Sonobond Ultrasonics, Inc., West Chester, Pa.

[21] Appl. No.: 119,794

[22] Filed: Nov. 12, 1987

[51] Int. Cl.⁴ ............................................... H05B 3/62
[52] U.S. Cl. ..................................... 219/391; 219/385; 219/521; 219/354; 264/1.5; 174/DIG. 8
[58] Field of Search ............... 219/391, 392, 521, 385, 219/535, 342, 354, 388; 264/1.5, 2.7, 230; 174/DIG.8; 350/96.20, 96.21; 156/52, 158, 379.8, 381, 433

[56] References Cited

U.S. PATENT DOCUMENTS

| | | | |
|---|---|---|---|
| 3,515,853 | 6/1970 | McAdams | 219/346 |
| 3,654,429 | 4/1972 | Strachan | 219/346 |
| 4,460,820 | 7/1984 | Matsumoto et al. | 219/385 |
| 4,526,732 | 7/1985 | Kakii et al. | 264/2.7 |
| 4,600,969 | 7/1986 | Hendrickson | 361/395 |
| 4,680,449 | 7/1987 | Yamada et al. | 219/455 |
| 4,695,705 | 9/1987 | Kulig | 219/354 |

Primary Examiner—E. A. Goldberg
Assistant Examiner—Teresa J. Walberg
Attorney, Agent, or Firm—John C. Andrade

[57] ABSTRACT

An apparatus, and process for insulating a splice with a heat shrinkable tube. The spliced wires and tube are transferred inside an oven by moving means, and after the tube is heat shrunk in the oven the wire assembly is then removed from the oven and automatically ejected.

20 Claims, 11 Drawing Sheets

AUTOMATIC HEATING DEVICE

BACKGROUND

This invention relates to heating a heat shrinkable material. More particularly it relates to an apparatus and method for heating a heat shrinkable tube positioned over a wire splice. For a wide variety of uses it is necessary to splice wires together. In splicing electrical wires together, portions of the insulating materials, usually rubber, plastic or like material, will have been removed, exposing the bare wires. A favored method of insulating the bare wires is by sliding a length of heat shrinkable tubing over the splice and the bare wire and heating the tubing so that the tubing will shrink. For many applications the tubing will have an inner layer of adhesive which will melt when heated and when removed from the heating source will seal the splice.

One method of heating the tubing has been by blowing a stream of hot air on the tubing through a hand held hot air gun. The hot air gun is bulky and tends to become quite hot. The disadvantages of the hot air gun method are that the gun is slow and poses a danger of burning in the operation due to the temperatures the gun can reach and the tubing is not heated symmetrically and can also burn.

Another method for heating the tubing is by the heating apparatus described in U.S. Pat. No. 3,515,853, wherein a heating device includes two aligned semicylindrical sides which, when closed, form a cylindrical structure that encircles the tubing to be heated. Each side has a plurality of spaced incandescent filaments which provide the heat.

Other methods for heating the tubing would include a toaster and a conveyor belt heater. The toaster would operate similar to a household toaster where the toaster would be constructed without the side panels and the wire assembly, comprising the at least one first wire spliced to the at least one second wire, with the heat shrinkable tube covering the splice, would be placed in the toaster thus activating the heating mechanism in the toaster which would consist of radiant heaters, and a timing device in the toaster would then pop the wire assembly up similar to toast popping up in a household toaster. In the conveyor belt arrangement the wire assembly would be laid on the conveyor belt and the conveyor belt would run the wire assembly through a heater and then out of the heater thus heat shrinking the tubing.

One important use of wire-splicing is in the manufacture of wire harnesses for automobiles. In making the wire harness a plurality of splices, connecting one or more first wires to one or more second wires, are made throughout the harness. The splices are typically made by welding, preferably by ultrasonic welding, and the splice is usually insulated by heat shrinkable tubing often having an inner adhesive layer.

Typically it takes an operator approximately seven seconds for the welding operation when welding one first wire to one second wire. As the number of first wires and the number of second wires increase, the length of time to complete the weld increases. It would be desirable for an operator performing the welding operation to also insulate the weld or the splice without substantially adding to the time required to complete the welding or splicing operation. It would also be desirable for any splice insulating operation to occupy the least possible amount of space. Any operation that occupied excessive space as would a typical conveyor belt arrangement, would make it awkward for the operator to both complete the welding operation and the insulating operation. For at least one commercially available ultrasonic welder the available space would be for a piece of equipment that was less than about 15 cm (6 inches) wide and about 15 cm (6 inches) high and less than about 50 cm long.

SUMMARY OF THE INVENTION

A novel apparatus and method for heating a heat shrinkable tube allowing an operator to efficiently insulate a splice without substantially adding to the time required to complete the splicing operation has now been discovered.

The apparatus for heating a heat shrinkable tube telescoped over a wire splice includes a frame having opposed upstanding sidewalls a top, bottom, front and back walls and an opening in said bottom wall; an oven; a pair of clamps located at each side of the oven; means for sensing the presence of a wire in said clamps; and a means actuated by the sensing means for moving the clamps from a position outside of the oven to a position past the slotted opening in the front wall of the oven and back so that a wire engaged in the clamps will enter and be retrieved from the oven. The oven has opposed upstanding sidewalls, a bottom, front and back walls defining the oven chamber, the bottom wall being attached to one end of the frame to position the oven thereon. The oven has a slotted opening extending through the front wall and the opposed sidewalls toward the back wall of the oven. The oven further has an opening in the bottom wall aligned at least partially with the opening in the bottom wall of the frame and an opening extending from the oven bottom wall opening to an opening through the top of the oven. This series of openings allows cooling air to pass through the apparatus and helps remove heat from the apparatus thus keeping the exterior of the frame at an acceptable temperature.

The oven more specifically includes an oven core having rectangular shaped side panels each having a finger shaped slotted opening, at least one small opening to receive a heating element and an elongated C-shaped panel aligned with the finger shaped slotted opening of the side panels and securely attached to the side panels. The oven core is substantially surrounded by a box shaped oven shell having a rectangular bottom panel having four edges, two side panels each having a finger shaped slotted opening and a rectangular shaped back panel and two rectangular shaped front panels. One side panel has at least one small opening of sufficient size to receive a heating element aligned with the small openings in the oven core side panels. The top front panel is attached to the top front edge of the two side panels and the bottom front panel is attached to the bottom front edges of the side panels. The oven core is surrounded by a refractory insulating material and the finger shaped slotted openings of the side panels and the oven shell are aligned. The refractory insulating material is a cement which when hardened locks the oven core within the oven shell. By surrounding the oven core with insulation material inside the oven shell, the problems associated with the brittleness of the insulating refractory cement are substantially avoided. The oven shell is surrounded on all sides and the bottom by the box shaped oven support which has a rectangular bottom panel which has a plurality of openings and four edges, two side wall panels each having a finger shaped slotted opening, a rectangular shaped back panel and two rectangular shaped front panels wherein the top front panel is securely attached to the top front edges of the side panels and the bottom front panel is attached to the bottom front edges of the side panels. The bottom edges of the two side panels, the back panel and the bottom front panel are securely attached to the bottom panel. The exterior back wall of the oven shell is securely attached to the interior back wall of the oven support and the finger shaped slotted openings of the side panels of the oven support are aligned with the finger shaped slotted openings of the oven shell. The distance between the exterior of the sidewalls of the oven shell and the corresponding interior sidewalls of the oven support are at least 0.9 cm. This spacing allows for the air to flow up through the bottom panel through the sides and produces a "chimney effect", to provide cooling of the oven.

The frame includes a boxed shaped container having a rectangular bottom panel having four edges, four side wall panels including a front back and two side panels which extend upwardly from and are secured to the four edges of the bottom panel. The frame has a rectangular top wall panel having four edges and a plurality of flanges extending across the width of the inside of the top. The flanges each have two openings aligned with each other. The top panel is removably attached to the upper edges of the four side panels and the front panel of the frame has an opening aligned with the opening formed by the front of the elongated C-shaped panel in the oven core. The front panel is angled forward from top to bottom. The back panel has a slotted opening behind which is attached a fan suitable for drawing air from the interior of the frame, and separate openings for compressed air and electrical input. The top panel of the frame also has slotted openings for air flow.

The oven shell and oven core are wrapped with insulation sheeting shrouds, the shell is wrapped on all sides and the bottom and the oven support is wrapped on all four sides. A narrow slit is cut in both the oven shell shroud and oven support shroud corresponding to the slotted finger shaped openings and the front openings. This allows a wire and tube that is brought into the oven to pass through the compliant insulation sheeting shroud but allows the shroud to then essentially return to its original position and still perform its insulating function. The shroud is typically comprised of a silicon based foam material reinforced with fiberglass cloth. The oven core, shell, and support are preferrably constructed of stainless steel. The stainless steel construction of the elongated C-shaped panel contributes to the efficiency of the oven by reflecting heat back within the oven core. In addition the stainless steel panel is heated by the heating elements and gives off infa-red heat. Another method of insulating the oven core would be by the use of a swinging door which could be attached to the sides of the oven shell and would substantially cover the opening in the front of the oven shell and possibly the openings in the sides of the oven shell. Preferrably a means for crimping the first and second wires would also be included in the apparatus. The apparatus is preferrably less than 15 cm in height and 15 cm in width.

The apparatus would optionally have a means for adjusting the position of the tube over the splice, however for most uses it is expected that such means would not be necessary. The apparatus would also be appropriate for heating a heat shrinkable material that was not tube shaped. The apparatus would be similar except there would for many uses need to be only one clamp located at one side of the oven support. An extension of the heat shrinkable material would be inserted in the clamp so that the movement of the clamp from a position outside the oven will cause the heat shrinkable material to enter and be retrieved from the oven. Also, the apparatus would be appropriate for heating a heat shrinkable tube over other than electrical wires such as optical fibers.

The method for covering the splice of at least one first wire to at least one second wire with heat shrinkable tubing includes sliding heat shrinkable tubing over at least one first wire prior to splicing the first wire to the second wire. The wires are then spliced together and the heat shrinkable tube is positioned over the splice. The first and second wires are then positioned in a pair of movable clamps positioned astride a heating device and a means for sensing the presence of the wires in the clamps signals a controller that the wires have been positioned in the clamps. The controller then signals the clamps to retract, thus bringing the wires and the heat shrinkable tube within the heating device. The tube remains in the oven at a temperature for a time sufficient to shrink the tube. The clamps are then returned to the their original position thereby removing the wires from the oven and the wires are then ejected from the clamps. The time from positioning the wires in the clamps to ejecting the wires from the clamps should be less than the time of sliding the tube over the at least one first wire and splicing the wires to the time when the wire is positioned in the clamps. When there is only one first wire and only one second wire, the time from positioning the wire in the clamps to the time the wire is ejected from the clamps should be less than 7 seconds. The heat in the oven is controlled within a predetermined normal temperature range by activating and deactivating a heating device in the oven for short intervals of time and through the combination of insulation and heat removal the temperature of the frame should be maintained at less than 60° C. After the wires are inserted in the clamps the controller automatically programs the movement of the clamps as outlined above.

DETAILED DESCRIPTION OF THE DRAWINGS

Figure 1:
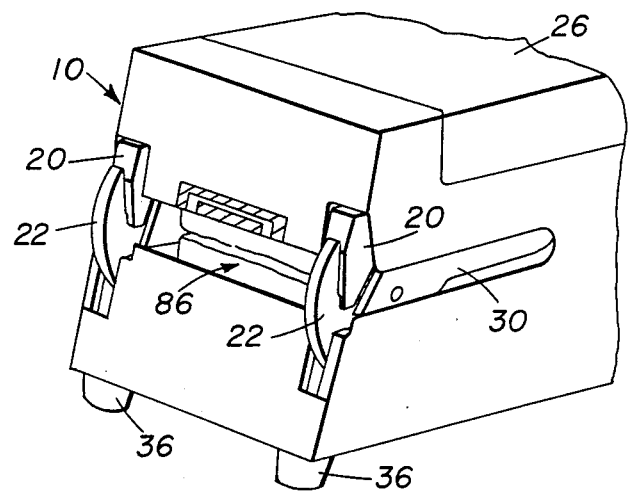
FIG. 1 a partial perspective view of the device before wires are placed in clamps.

Referring now to FIGS. 1–4, the apparatus generally includes a frame 10 a pair of clamps comprised of links 20 and cradles 22 a removable cover 26 serving as the top of frame 10 and a plurality of frame legs 36. The distance from the bottom of the frame legs 36 to the cover 26 is approximately 13 cm. (5⅛ inches).

Figure 5:
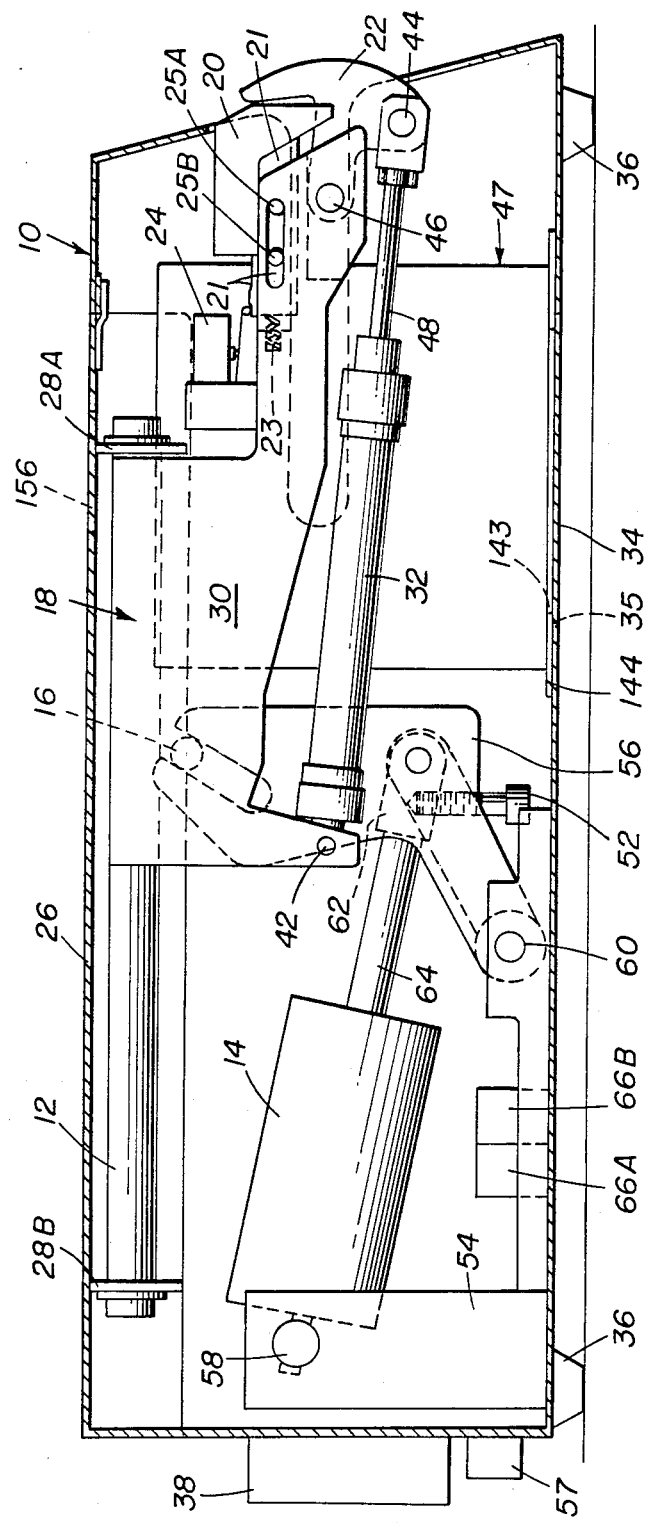
FIGS. 5-8 are side elevation views of the device shown in 1-4 respectively with the side frame removed.
Figure 6:
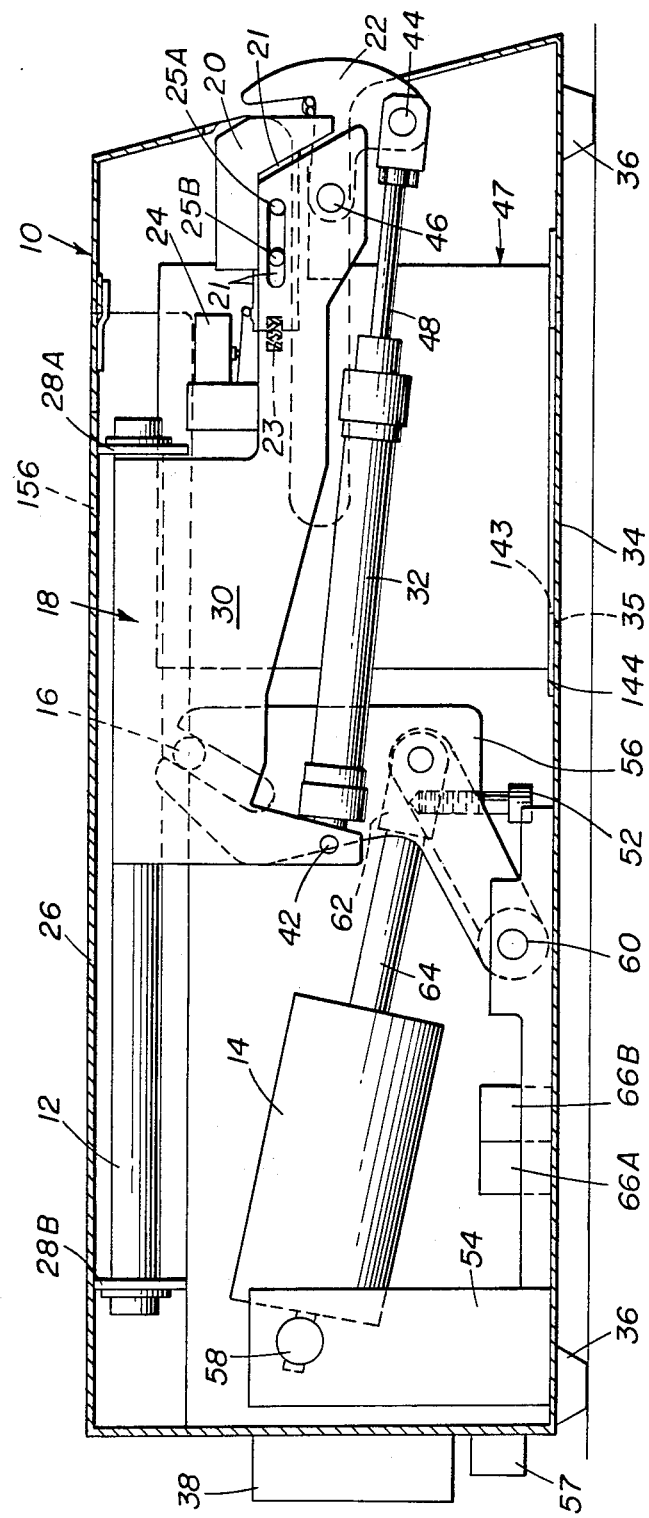
Figure 7:
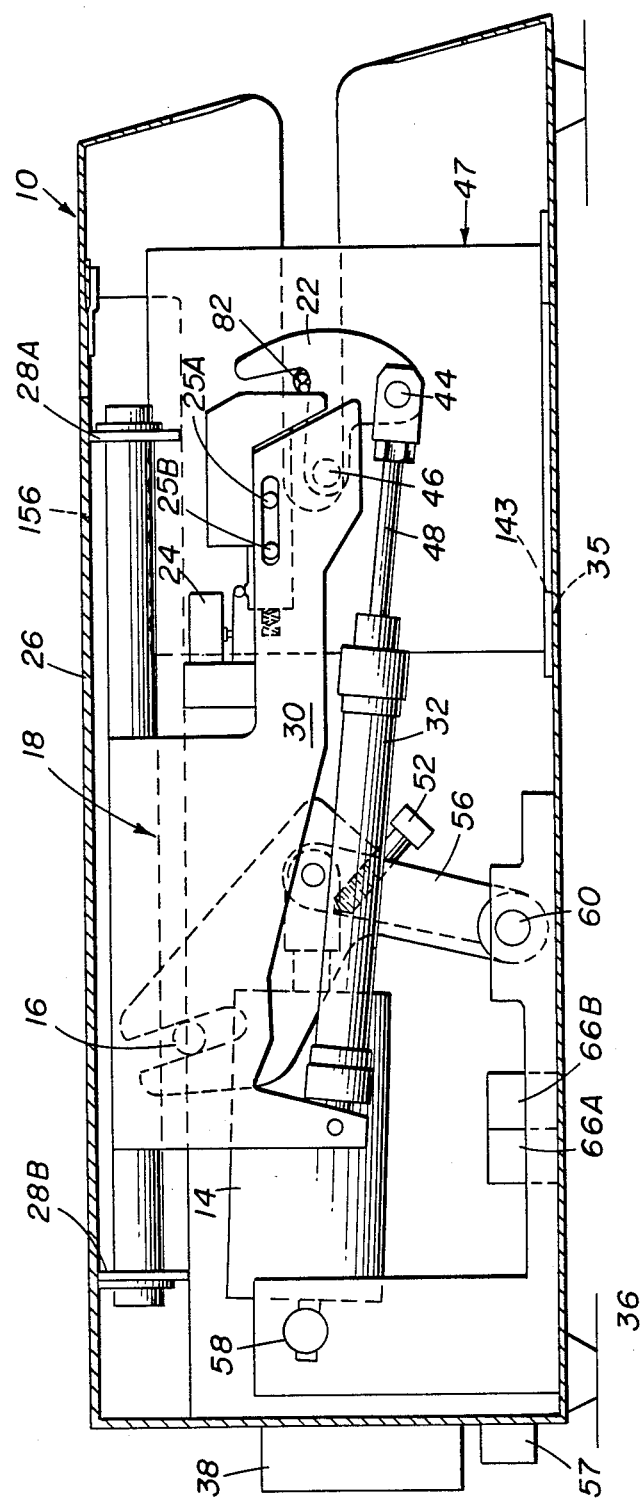
Figure 8:
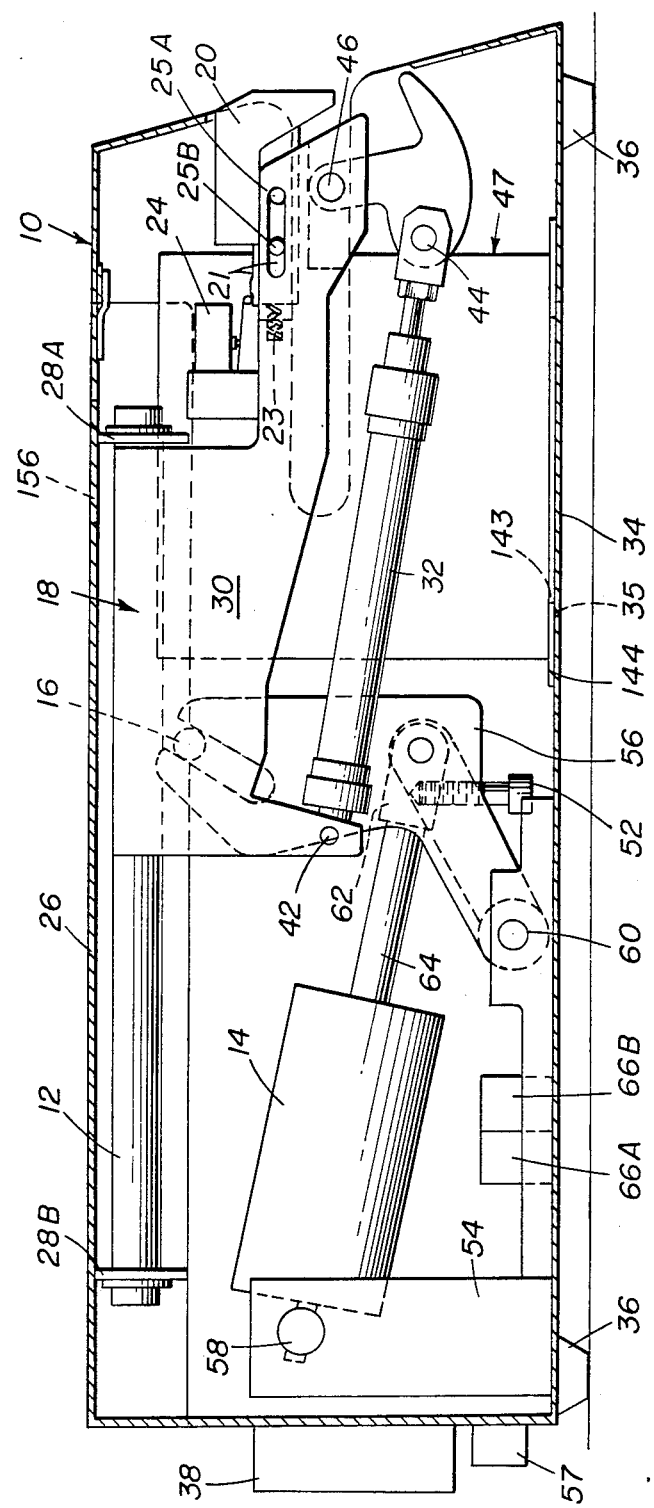

FIGS. 5–8 are side views of the heating device showing a moving means of the present invention. Referring to FIG. 5 the cradle 22 and link 20 are shown mounted to a moving means which in the preferred embodiment is a sled 18, slidably attached to two rods 12. The rods are attached to the top 26 of the frame by front and back brackets, 28A and B respectively and are attached to the brackets by snap rings. The sled 18 extends horizontally substantially between the two rods 12, having two armlike projections 30, to which are attached the microswitch 24 and the link 20. The link 20 is slidably attached to the sled and urged forward at all times by a spring mechanism 23. When a wire is inserted between the link 20 and the cradle 22, the link is forced backwards thus pushing block 21 back, activating microswitch 24. The movement of block 21, which is securely attached to link 20, backwards or forwards is limited by pins 25A and B. The actuating cylinder 32 is rotatably attached to the sled at the pivot 42 and the cradle 22 is rotatably attached to the rod 48 at the pivot 44 and to the sled at pivot 46. Rod 48 can be retracted within the actuating cylinder 32. When the rod 48 is retracted, the cradle retracts within the frame 10 so that any wire held between the link 20 and the cradle 22 would drop. The particular construction of the cradle and the pivots was designed to minimize pinch points for an operator. The actuating cylinder 14 is connected to the mounting bracket 54 by a pivot 58. The lever 56 is connected to the mounting bracket 54 by a pivot 60. The mounting bracket is securely attached to the bottom of the frame. The rod 64 is slidably connected to the inside of the actuating cylinder 14 at one end and by a clevis 62 to the lever 56 at the other end. The lever 56 is in contact with the pin 16. The pin 16 is attached to and extends inward from the armlike projection 30 of the sled 18. The lever 56, having engaged pin 16, when it moves to its back position, slides sled 18 over rods 12 so that the back portion of sled 18 is as shown in FIG. 7.

Figure 9:
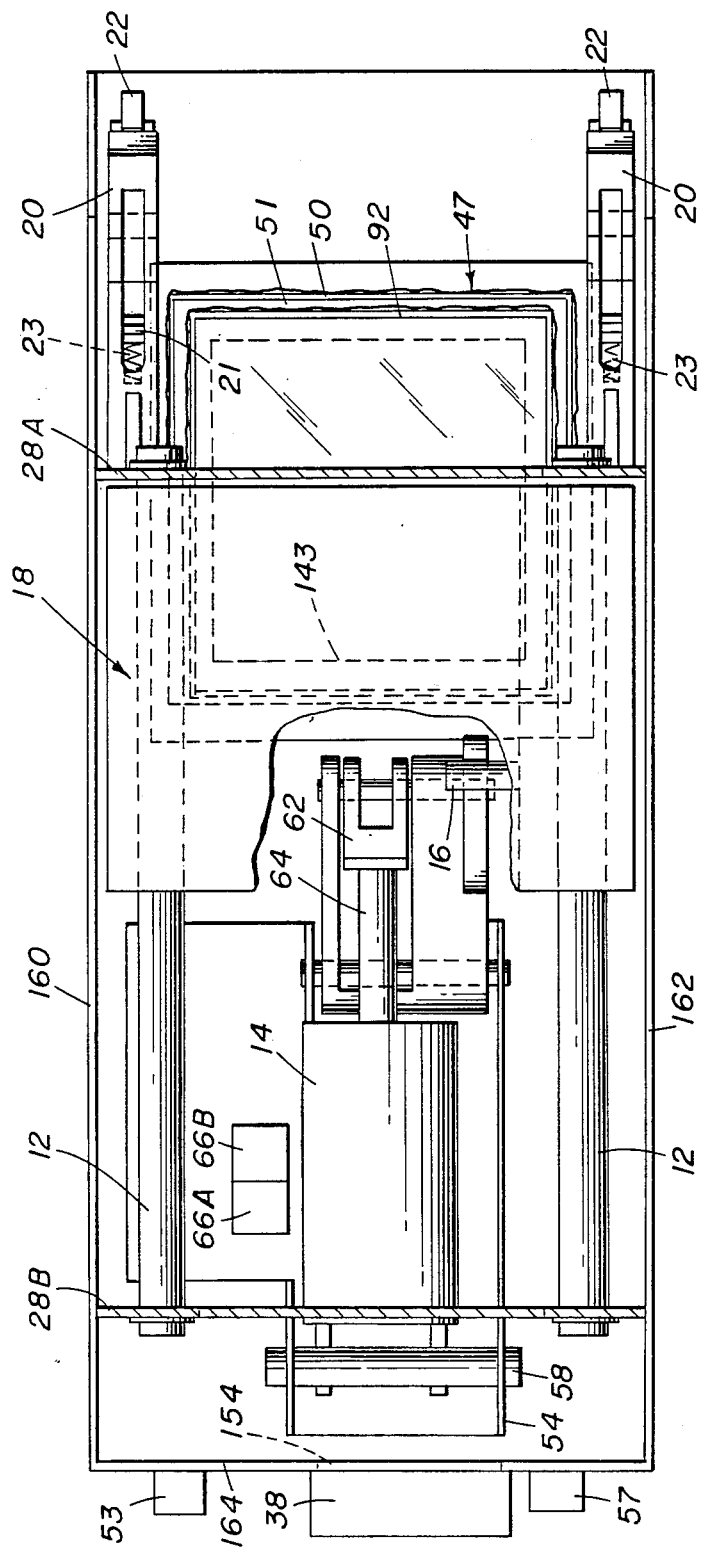
FIG. 9 is a plan view of the device of FIG. 5.

FIG. 9 is a plan view of the device of FIG. 5. The oven support 50 is approximately 10.16 cm (4 inches) wide. The distance between the frame sidewalls 160 and 162 is approximately 14 cm (5½ inches). In the back panel 164 of the frame 10 are the openings for compressed air 57, electrical input 53 and for air flow 154. The slotted opening for air flow 154 permits the fan 38 to draw the air from within the frame 10.

Figure 10:
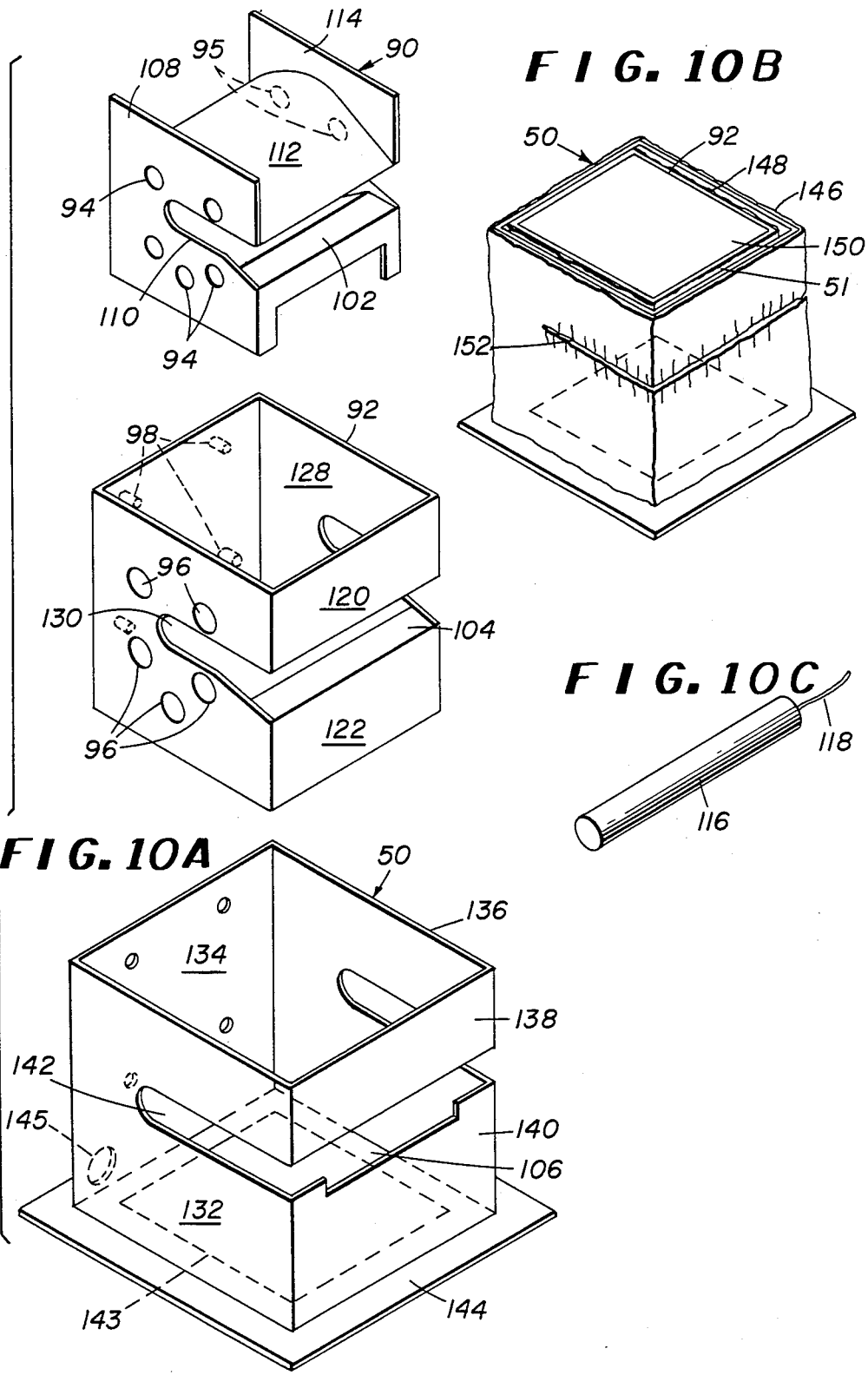
FIG. 10A is a exploded view showing the oven.
FIG. 10B is a perspective view of the oven.
FIG. 10C is a perspective view of the cartridge heater.

FIG. 10A is an exploded view showing the structure of the oven 47 which as shown in FIGS. 5–8 is mounted to one end of frame 10 with opening 143 in the bottom of the oven support 50 of the oven 47, partially in line with the opening 35 in the bottom 34 of the frame 10. The frame legs 36 raise the frame allowing air to flow through opening 35. The oven core 90 is made of stainless steel. The sides 108 and 114 of the oven core are rectangular shaped panels of stainless steel having a finger shaped opening 110 and at least one circular hole 94 and 95 (five holes are exemplified in FIG. 10A). The holes must be of a sufficient diameter to accommodate the heating element 116 shown in FIG. 10C. The heating element will typically be a standard commercial resistence heater. The heating element shown in FIG. 10C is a 120 watt cartridge heater that is approximately 0.95 cm in diameter and 5.72 cm long. The illustrated cartridge heater has a coil shaped nichrome wire embedded in very fine silica sand encased in a metal tube and having an electrical lead 118 as shown FIG. 10C. The oven core further has an elongated C-shaped section securely attached to the interior surface of both panels 108 and 114 as shown in FIG. 10A. The elongated C-shaped section is of sufficient size so that the top forward edge corners of the elongated C-shaped section are attached to the bottom corners of the front top portion of panels 108 and 114 that lie above the finger shaped opening 110. The bottom forward edge corners of the C-shaped section is attached to the top corners of the front bottom portion of panels 108 and 114 that lie below the finger shaped opening 110 as shown in FIG. 10A. The opening 102 in the front of the oven core must be of sufficient size to accommodate the tube. The tube would typically be less than 2 cm in diameter and 6.35 cm long. The finger shaped openings 110 must be of sufficient size to accommodate the at least one first wire and at least one second wire.

The oven shell 92 shown in FIG. 10A is a stainless steel box shaped container composed of a rectangular bottom wall panel having four edges, side panel 124, side panel 128, back panel 126 and front panels 120 and 122. Panels 120, 124, 126, and 128 are secured to the four edges of said bottom panel. Side panels 124 and 128 have finger shaped openings, shown as 130 in FIG. 10A. Panel 124 has at least one circular hole 96 (five holes are exemplified in FIG. 10A), and the holes must be of sufficient diameter to accommodate the heating element 116 and are aligned with holes 94 and 95 in the oven core side panels. The front panel 122 is securely attached to the top front edges of panels 124 and 128. The front bottom panel 120 is securely attached to the front bottom edges of panels 124 and 128 and the opening 104 is defined by the front panels 120 and 122 and the finger shaped openings 130. Attached to the back of the back panel 126 are a plurality of screws 98.

The oven support 50 is also made of stainless steel and is a boxed shaped container composed of a rectangular bottom wall panel having four edges, two rectangular side panels 132 and 136 each having a finger shaped opening 142, a rectangular shaped back panel 134 having holes 100 aligned with the screws 98 on the back panel 126 of the oven shell 92, rectangular front top panel 138 securely attached to the top front edges of panels 132 and 136, and a rectangular front bottom panel securely attached to the front bottom edge of panels 132 and 136. The opening 106 is defined by the front panels 138 and 140 and the finger shaped openings 142. The back panel 134 has opening 145 for the heating elements electrical leads and is securely attached to the back edges of panels 132 and 136. The bottom panel 144 is securely attached to the bottom edges of panels 132, 134, 136 and 140 as shown in FIG. 10A.

FIG. 10B is a perspective view of the exterior of the oven. The top of the oven comprises the refractive insulating material 150 covering the oven core (90 shown in FIG. 10A) surrounded by the top of the sides back and front of the oven shell 92, surrounded by insulation sheeting shroud 148 surrounded by the top of the sides, back and front of the oven support 50, surrounded by insulation sheeting shroud 146. The shroud 148 surrounds the sides, back, front and bottom of the oven shell 92. The shroud 146 further surrounds the sides, back and front of the oven support 50. The space between 50 and 92 is designated 51. The insulation shroud 148 should be closely pressed against the sides of the oven shell 92, so as not to inhibit the flow of air through the opening 35 in the bottom of the frame (shown in FIGS. 5-8), through the opening in the bottom of the oven support 143 and through the space 51 between the oven shell and the oven support. Both the insulation shroud 146 and 148 are slit along the finger shaped and front openings of both oven shell 97 and oven support 50. The slits in the oven shell are not shown but would be parallel to the slits 152 in the oven support shown in FIG. 10B.

Figure 11:
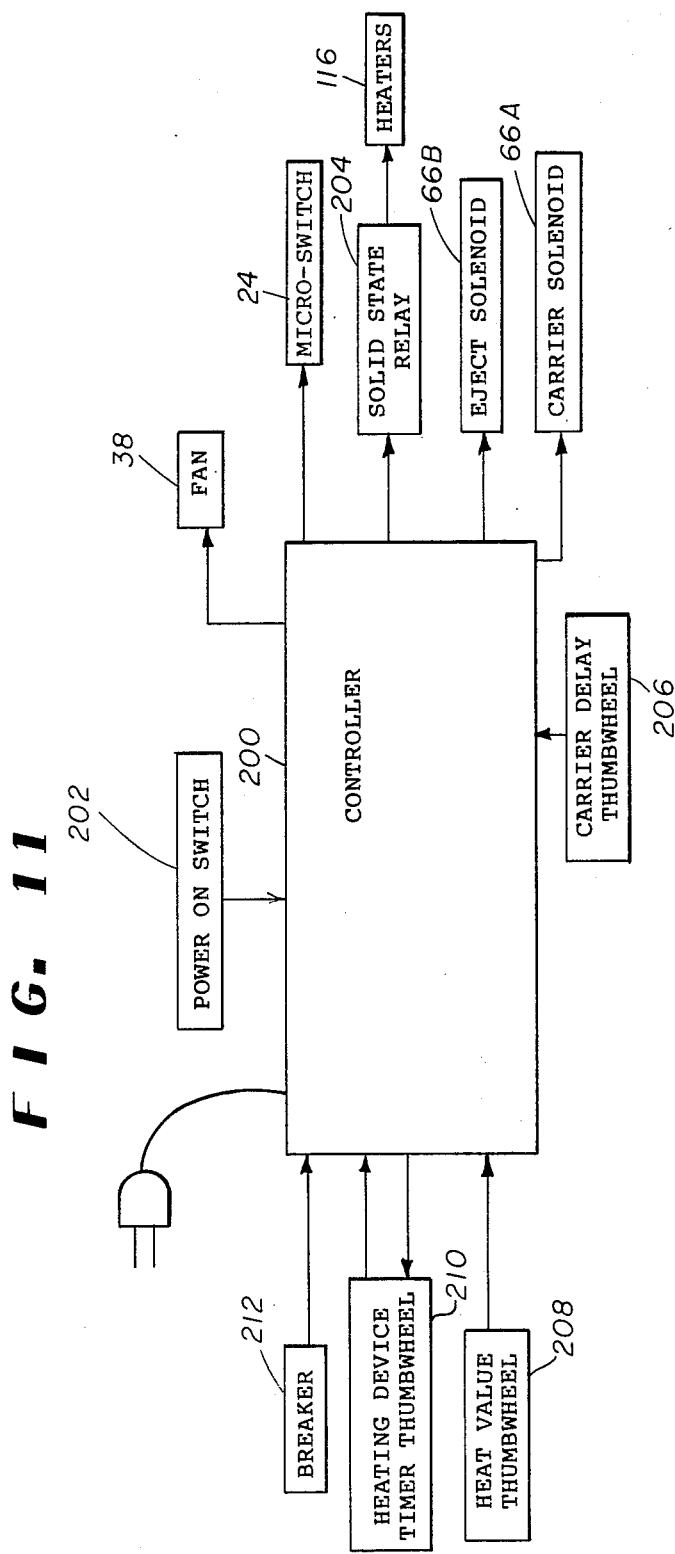
FIG. 11 is a block diagram of the control system for the the heating device of this invention.

FIG. 11 is a block diagram of the control system of the heating device described above and includes a controller 200 coupled to the power on switch 202, the carrier delay 206 and heat value thumbwheels 208, the heating device timer thumbwheel 210 and the breaker 212. The carrier delay thumbwheel regulates the time between the insertion of a wire as signaled by the activation of the micro-switch 24 and the signaling of the carrier solenoid 66A causing the sled to retract, pulling the wires into the oven. The time period would typically be set for a longer period as the operator is splicing more wires together; and the time it takes to insert the wires between the links and the cradle increases. The heat value thumbwheel 208 regulates the amount of time the heaters are on. The process for regulating the temperature within the oven is to pulse the heaters, meaning to turn the heaters on and off continuously. The heater is typically off for four seconds and would be on for 0-5 seconds. A setting of zero (0) indicates that the heater is off. Settings of 1,2,3,4,5 indicate that the heater is on for 1,2,3,4 and 5 seconds respectively and in one embodiment correspond to temperatures in the oven chamber of approximately 370° C., 425° C., 480° C., 540° C. and 595° C. respectively. The temperature in the chamber is maintained typically within a range of about 20°-30° C. between the period when the heater is on and off. There is no need to monitor the temperature by using a probe or thermometer, which would be costly and take up valuable space. The heating device timer thumbwheel 210 controls the amount of time the tube is within the oven. A one wire to one wire splice will need to be in the oven for typically about 7 seconds. This time increases as more wires are being spliced together. The fan 38, micro-switch 24, the eject solenoid 66B, the carrier solenoid 66A, and the solid state relay 204 and heater 116 are controlled by the controller. The controller 200 comprises an 8-bit microprocessor, model no. SLC 100 by Allen-Bradley Co. of Milwaukee, Wis.

Figure 12:
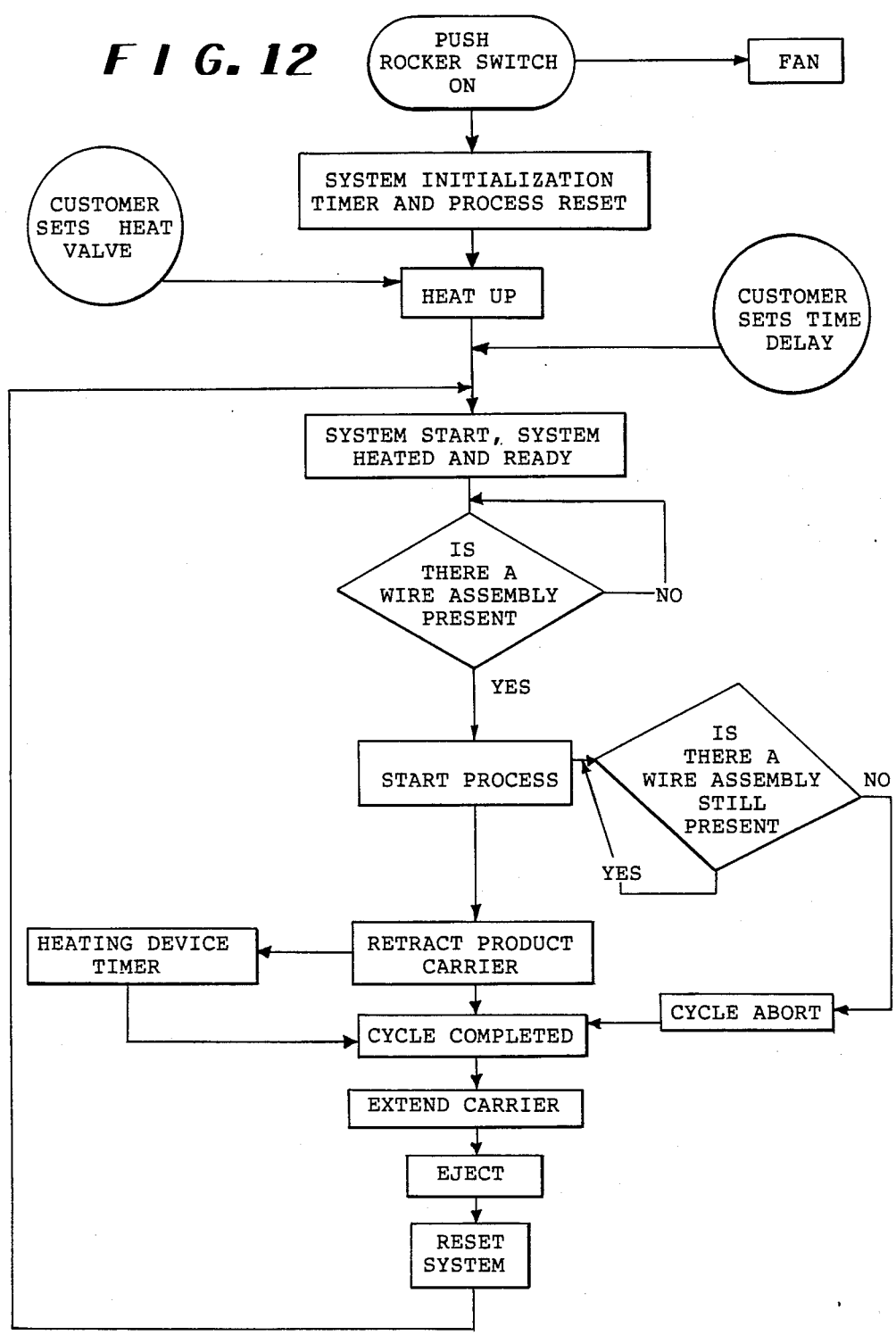
FIG. 12 is a logic diagram for the heating device of this invention.

With reference to the logic flow diagram, FIG. 12, the operation of the automatic splicing device of this invention will be described as it would be used by an operator.

Figure 2:
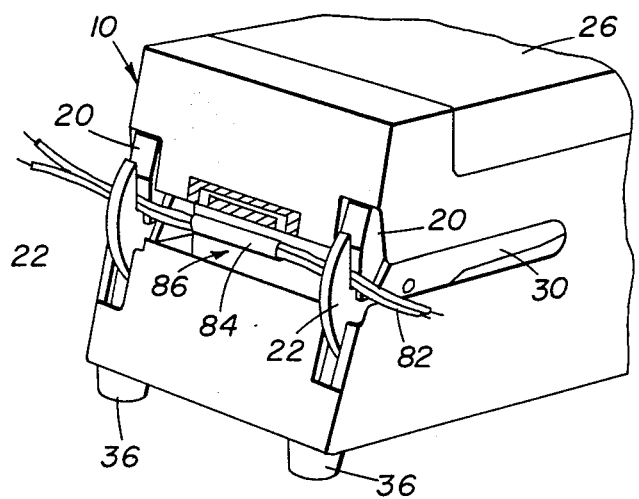
FIG. 2 a partial perspective view of the device with wires shown in clamps.
Figure 3:
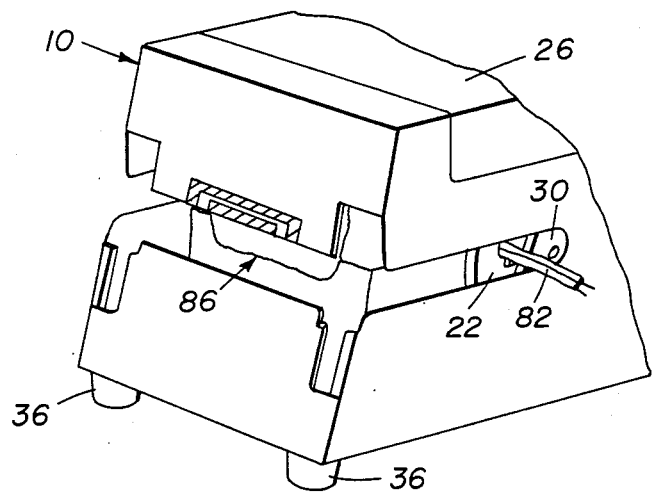
FIG. 3 a partial perspective view of the device showing wires in oven.
Figure 4:
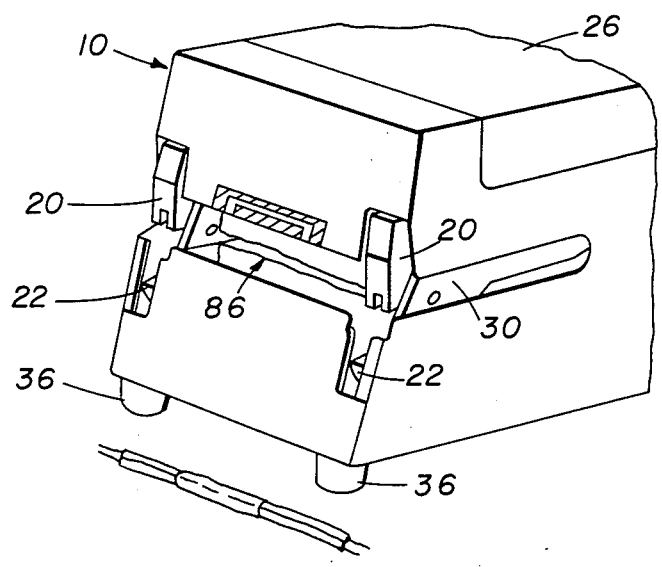
FIG. 4 a partial perspective view of the device showing wires ejected.

The operator would first turn the power switch to the on position, and the fan would automatically operate. All of the timers would be reset and the operator would set the heating value thumbwheel 208, the carrier delay thumbwheel 206 and the heating device timer thumbwheel 210. After the system is heated for a pre-set period, necessary to reach the desired temperature a ready light (not shown) would be activated. In one embodiment with 5 120 watt heaters, this time would be about 5-8 minutes to reach a temperature of 370°-595° C. Cartridge heaters should be pulse heated for about the first 40 seconds, and then continuously heated for the remaining warm up time. This enhances the life of the cartridge heaters allowing the heaters to drive off any excess moisture that has built up. The system is then heated and ready for operation and would appear as shown in FIGS. 1 and 5. The system remains at the ready stage until the operator inserts a wire 82 between the links 20 and the cradles 22 as is shown in FIGS. 2 and 5. The links 20, before the wires are inserted, are in contact with the cradles and are flush with or recessed slightly from the face of the frame 10. The heat shrinkable tube 84 has been positioned over the splice (not shown and covered by the tube) and is aligned with the opening 86 in the frame 10. The insertion of the wire moves the spring loaded link which in turn moves the block 21, which triggers the micro-switch 24. The micro-switch signals the controller 200 that there is a wire present. The controller then waits the amount of time set by the carrier delay thumbwheel 206 and then signals to solenoid valve 66A to retract the carrier. The solenoid 66A then causes actuating cylinder 14 to retract rod 64 which acts upon chasis 62 to move lever 56 from the position shown in FIG. 5 to the position shown in FIG. 7. In so doing the lever 56 acts upon pin 16 which is connected to sled 18. The sled 18 is then slid back along rods 12 and brings the link and cradle back to the position shown in FIGS. 3 and 7 in which the heat shrinkable tube is thereby positioned in the middle of the oven core chamber formed by the elongated C-shaped section 112 as shown in FIG. 10A. Meanwhile the micro-switch 24 continues to signal the controller 200 that a wire is still present. If during the process a wire were to come out of the clamping operation of either of the link and cradle combinations, micro-switch 24 would signal the controller to abort the process and carrier would immediately be extended as described below.

Figure 13:
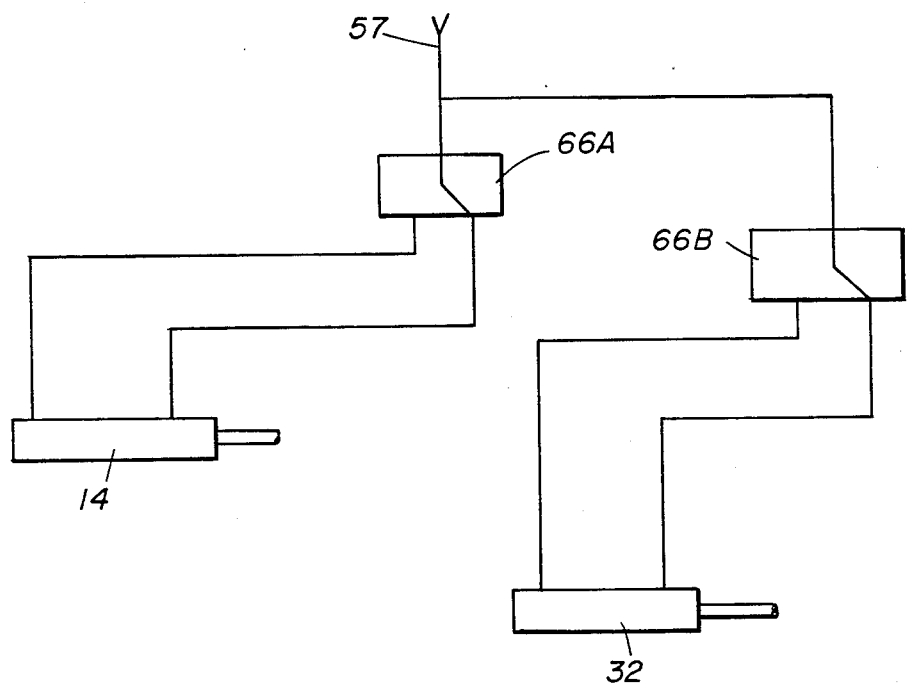
FIG. 13 is a schematic diagram for the pressurized air operation of the actuating cylinders.

After the tube is brought within the oven chamber, the heating device timer is activated and when the preset time period is reached, the controller 200 signals the solenoid 66A which causes the activating cylinder 14 to extend rod 64 which acts upon chasis 62 to move lever 56 from the position shown in FIG. 7 to the position shown in FIG. 5. In so doing the lever 56 acts upon pin 16 connected to sled 18. The sled is the slid along rods 12 and brings the link and cradle back to the position shown in FIGS. 1 and 5. The adjusting screw 52 controls the forward position of the link and cradle. The next step is for the controller 200 to signal the solenoid 66B which causes the actuating cylinder 32 to retract rod 48 which rotates cradles 22 around the pivots 44 and 46 causing the cradle to reach the position shown in FIGS. 4 and 8 and thus automatically ejecting the wires. The controller then resets the system and returns the links and cradles to the position shown in FIGS. 1 and 5 and activates the ready light (not shown) awaiting the next wire to be inserted. FIG. 13 is a schematic diagram for the operation of the actuated cylinders 14 and 32. High pressure air enters through the opening 57 in the frame 10, and is connected to the solenoids 66A and 66B. Solenoid 66A directs high pressure air to cylinder 14 at either of two different locations depending upon whether the cylinder is being actuated to retract the carrier and thus pull the wires and heat shrinkable tube within the oven or to extend the carrier and thus push the wires and tube outside of the oven. The solenoid 66B operates in the same manner and activates actuating cylinder 32 to either return and keep the clamp in an upright position or to rotate the clamp inside the frame, thus allowing the wire to drop from the clamp.

We claim:

1. An apparatus for heating a heat shrinkable tube telescoped over a wire splice comprising:
   (a) a frame;
   (b) an oven having opposed, upstanding sidewalls, a bottom, front and back walls defining the oven chamber, said bottom wall being attached to one end of said frame to position said oven thereon, said oven having a slotted opening extending through the front wall and said opposed side walls toward said back wall to a location within said chamber;
   (c) a pair of clamps located at each side of the oven;
   (d) means for sensing the presence of a wire in said clamps;
   (e) a means actuated by said sensing means for moving said clamps from a position outside of said oven to a position past the slotted opening in the front wall of said oven and back so that a wire engaged in said clamps will enter and be retrieved from said oven.

2. The apparatus of claim 1 wherein the frame has opposed upstanding sidewalls, a top, bottom, front and back walls and an opening in said bottom wall; said oven having an opening in the oven bottom wall aligned at least partially with said opening in said bottom wall of the frame and additionally the oven has an opening extending from said oven bottom wall opening to and through an opening in the top of said oven permitting air to flow from below said frame bottom wall opening through the top of the oven.

3. The apparatus of claim 2 wherein the oven comprises:
   (a) an oven core having rectangular shaped side panels, each having a finger shaped slotted opening, an elongated C-shaped section aligned with said finger shaped slotted openings of said side panels and securely attached to said side panels wherein the side panels have at least one opening for receiving a heating element;
   (b) a boxed shaped oven shell having a rectangular bottom panel having four edges, two side panels each having a finger shaped slotted opening and a rectangular shaped back panel and two rectangular shaped front panels, wherein one side panel has an opening of sufficient size to receive a heated element and the top front panel is attached to the top front edge of the two side panels and the bottom front panel is attached to the bottom front edges of the side panels, said oven core surrounded by a refractory insulating material and located within said oven shell said finger shaped slotted opening of said side panels of said oven core aligned with said finger shaped slotted opening of said side panels of said oven shell;
   (c) a boxed shaped oven support composed of a rectangular bottom panel having a plurality of openings, having four edges, two side wall panels each having a finger shaped slotted opening, a rectangular shaped back panel and two rectangular shaped front panels wherein the top front panel is securely attached to the top front edges of the side panels and the bottom front panel is attached to the bottom front edges of the side panels and the edges of the two side panels the back panel and the bottom front panel are securely attached to the bottom panel, the exterior back wall of said oven shell securely attached to the interior back wall of said oven support and the finger shaped slotted openings of the side panels of said oven support being aligned with the finger shaped slotted openings of said oven shell, and wherein the distance between the exterior of the side walls of the oven shell and the corresponding interior side walls of said oven support are greater than about 0.9 cm.

4. The apparatus of claim 3 wherein the frame comprises:
   a box shaped container composed of a rectangular bottom panel having four edges; four side wall panels, comprising a front, back and two side panels, extending upwardly from and secured to the four edges of said bottom panel; a rectangular top wall panel having four edges and a plurality of flanges extending across the width of the inside of the top, said flanges each having two openings aligned with each other, said top panel angled forward from top to bottom, removably attached to the upper edges of the four side panels, said front panel having the opening aligned with the oven core opening, and said back panel, having a slotted opening and separate openings for compressed air and electrical input, said top panel of said housing further having slotted openings for air flow.

5. The apparatus of claim 4 further comprising a fan, suitable for drawing air from the interior of said frame, attached to the rear of said frame aligned with said slotted opening in the back panel of said frame.

6. The apparatus of claim 1 wherein each clamp comprises a cradle pivotally mounted to said means for moving said clamp; a link slidably mounted to said means for moving said clamp, for movement toward and away from said cradle and means for resiliently urging said link toward said cradle.

7. The apparatus of claim 6 wherein said sensing means comprises a switch actuated by movement of said link away from said cradle when said wire is inserted between said link and said cradle.

8. The apparatus of claim 4 further comprising insulation sheeting shrouds wrapped around the sides of and bottom of the oven shell and the sides of the oven support forming a compliant baffle, said shrouds having a narrow slit in correspondence with slotted finger shaped and front openings of both the oven shell and the oven support.

9. The apparatus of claim 8 wherein the shroud is composed of silicon based foam material reinforced with fiberglass cloth.

10. The apparatus of claim 1 further comprising means for automatically ejecting said wire from said clamps after said wire has been retrieved from the oven.

11. The apparatus of claim 1 further comprising means for delaying the time between simply the presence of a wire in said clamps and the actuating of the moving means by the sensing means.

12. The apparatus of claim 4 further comprising a visual guide on the front panel of the frame for guiding the placement of the tube in the opening of the opening in the frame.

13. The apparatus of claim 4 wherein height and width of the frame and the front panel are all less than 15 cm.

14. The apparatus of claim 4 further comprising a plurality of legs at least 1.0 cm long attached to the exterior of the bottom of the frame.

15. An apparatus for heating heat shrinkable material comprising:
   (a) a frames having opposed upstanding sidewalls a bottom, top, front and back walls, wherein the distance between the top and bottom walls is less than about 15 cm.
   (b) an oven core having opposed, upstanding sidewalls, a bottom, front and back walls defining the oven chamber, said bottom wall being attached to one end of said frame to position said oven thereon, said oven having a slotted opening extending through the front wall and said opposed side walls toward said back wall to a location within said chamber;
   (c) at least one clamp located on at least one side of the oven;
   (d) a means for moving said clamp from a position outside of said oven to a position past the slotted opening in the front wall of said oven and back so that an extension of said heat shrinkable material engaged in said clamp will cause said heat shrinkable material to enter and be retrieved from said oven.

16. The apparatus of claim 15 further comprising a means for sensing the extension of said heat shrinkable material in said clamp and wherein the means for moving said clamp is actuated by said sensing means.

17. A method for heating heat shrinkable tubing telescoped over a wire splice of a plurality of wires comprising:
   (a) positioning the wires in a pair of clamps located for movement to and from a position past a slotted opening into a heated oven;
   (b) sensing the presence of said wires in said clamps; and
   (c) automatically actuating said movement when the presence of said wires is detected.

18. The method of claim 17, including the additional step of automatically ejecting said wires from said clamps after said wire splice is retrieved from said oven by movement.

19. The method of claim 18, wherein, where there is only one first wire and one second wire the time from positioning to ejecting is less than seven seconds.

20. The method of claim 17, further comprising the step of controlling the heat in the oven within a predetermined normal temperature range by activating land deactivating a heating device inside the oven for short intervals of time and cooling the heating device to maintain a temperature of less than 60° C. at the exterior of the housing.

* * * * *